United States Patent [19]

Weishaupt et al.

[11] Patent Number: 4,818,887

[45] Date of Patent: Apr. 4, 1989

[54] ARRANGEMENT FOR THE RECOGNITION OF OBSTACLES FOR MOTOR VEHICLES

[75] Inventors: Walter Weishaupt, Munich; Walter Mehnert, Ottobrunn, both of Fed. Rep. of Germany

[73] Assignee: Bayerische Motoren Werke Aktiengesellschaft, Munich, Fed. Rep. of Germany

[21] Appl. No.: 109,316

[22] Filed: Oct. 19, 1987

[30] Foreign Application Priority Data

Oct. 17, 1986 [DE] Fed. Rep. of Germany ....... 3635396

[51] Int. Cl.[4] .............................................. G01N 21/86
[52] U.S. Cl. .................................. 250/561; 250/222.1; 356/1
[58] Field of Search ............... 356/1, 4; 250/561, 221, 250/222.1

[56] References Cited

U.S. PATENT DOCUMENTS

| | | | |
|---|---|---|---|
| 3,493,920 | 2/1970 | MacMunn | 340/1 |
| 4,325,639 | 4/1982 | Richter | 356/1 |
| 4,582,424 | 4/1986 | Kawabata | 356/1 |
| 4,659,922 | 4/1987 | Duncan | 250/221 |
| 4,716,298 | 12/1987 | Etoh | 250/561 |

Primary Examiner—David C. Nelms
Attorney, Agent, or Firm—Barnes & Thornburg

[57] ABSTRACT

An arrangement for the recognition of obstacles for motor vehicles with a transmitter and a receiver for electromagnetic radiation which are directed to an examination area (close range) that commences in direct proximity of the motor vehicle; a second receiver is provided which together with the transmitter is directed to a second examination area (distance or long range) which commences at a considerably greater distance in front of the motor vehicle than the close range. As a result thereof, interfering reflections at water droplets (fog) can be far-reachingly excluded.

5 Claims, 2 Drawing Sheets

ARRANGEMENT FOR THE RECOGNITION OF OBSTACLES FOR MOTOR VEHICLES

BACKGROUND AND SUMMARY OF THE INVENTION

The present invention relates to an arrangement for the recognition of obstacles for motor vehicles, with a transmitter and a receiver for electromagnetic radiation which are directed onto an examination area (close range) that commences in direct proximity.

Such arrangements are generally known. For example, visible light which is emitted from a laser light source serves as electromagnetic radiation. In addition thereto, the radiation may also be invisible and may stem, for example, from a source for infrared light.

It is desirable with such arrangements to cover as large as possible an examination area. This can take place best in such a manner that the transmitter and receiver transmit and receive their radiation along the same path. In the ideal case, for example, in the case of a laser, the output and input optical systems may coincide. As an approximation, however, they may also be arranged directly adjacent one another.

However, problems occur with such an arrangement under special atmospheric conditions. Among those is to be understood the case of water droplets which appear in large number between an obstacle to be detected and the vehicle. Typically, this is the case during fog or strong rain showers. These water droplets then reflect the electromagnetic radiation and render more difficult or prevent the recognition of an obstacle.

The present invention is concerned with the task to provide with low constructive expenditures an arrangement of the aforementioned type which, in the case of atmospheric disturbances, such as fog or strong rain, nonetheless permit the recognition of an obstacle.

The underlying problems are solved according to the present invention by a second receiver which, together with the transmitter, is directed onto a second examination range (distant range) which commences at a considerably larger distance than the close range.

As a result of the enlargement of the distance of the examination area, the reflection at the water droplets in the close range no longer plays any role. This reflection corresponds approximately to the reflection at an obstacle that is located relatively close to the vehicle. Added thereto is a further circumstance. The greater distance of the examination area is usually accompanied with a reduction in size of this area. However, the number of the water droplets capable, respectively, leading to a disturbing reflection, is also correspondingly reduced. The reduction of the number of fog droplets now leads to a reduction of the disturbing reflections which is considerably stronger than the reduction of the number of fog droplets. This can be traced back to the fact that the electromagnetic radiation is scattered also several times at these water droplets.

Further improvements of the present invention are obtainable by additional features. A considerable improvement in connection with the recognition of obstacles both in the proximity of the motor vehicle as also at the distance can be achieved if the second receiver together with a second transmitter is also directed to a further close range and the second transmitter together with the first receiver is directed to a distant range and the transmitters/receivers are adapted to be alternately interconnected cross-wise. As the two close areas are not coincident as a rule, obstacles can be recognized therewith at least approximately gaplessly within this area. The same is also true for the distant area. A noticeable improvement both as regards the range as also the width of the examination area results therefrom.

In contrast to a manual switching, which is also possible, an automatic switching to the cross-wise interconnection of transmitters and receivers can be obtained according to the present invention, for example, in conjunction with turning on a fog light or as a function of the intensity of the radiation reflected from the close range. These characteristics provide safe indicia for the necessity of the switching.

BRIEF DESCRIPTION OF THE DRAWINGS

These and other objects, features and advantages of the present invention will become more apparent from the following description when taken in connection with the accompanying drawing which shows, for purposes of illustration only, one embodiment in accordance with the present invention, and wherein.

DETAILED DESCRIPTION OF THE DRAWINGS

Figure 1A:
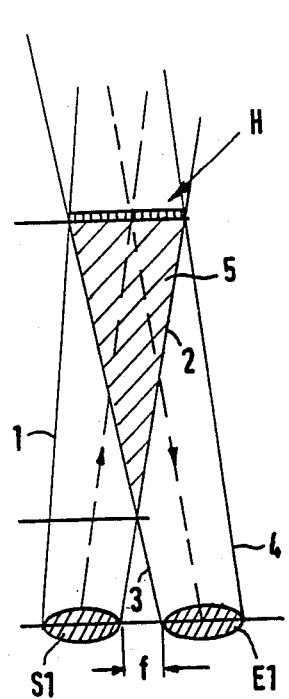
FIG. 1 is a schematic view illustrating in parts a and b thereof an explanation of the principle of the present invention.

Referring now to the drawing wherein like reference numerals are used throughout the various views to designate like parts, in the left part of FIG. 1, reference character S1 designates a transmitter and reference character E1 a receiver for electromagnetic radiation in the form of visible light. The transmitter emits this light from a laser light source (not shown). The transmitter S1 and the receiver E1 are arranged closely adjacent one another. For reasons of clarity, a small distance is indicated by f.

The light emitted by the transmitter S1 is emitted into a conically shaped emission area whose boundary lines are indicated by 1 and 2. The receiver E1 receives radiation from a conically shaped receiving area whose boundary lines located in the viewing or observation plane are designated by 3 and 4. The observation range extends in front of a motor vehicle (not shown) and includes the road (not shown) for the motor vehicle.

The overlapping of transmission and receiving area produces an examination area 5 located close to the motor vehicle whose approximately diamond-shaped boundary lines are formed by the lines 1 to 4. An obstacle H located in this examination area reflects the radiation emitted from the transmitter S1 to the receiver E1 and can thus be recognized.

If a large number of small water droplets, as they exist, for example, in the case of fog, are present between an obstacle and the transmitter S1, respectively, the receiver E1, then the radiation of the transmitter S1 is reflected at these water droplets and thus leads to a strong dispersion or scattering. This may even lead so far that the obstacle is no longer recognized. The backscattering or back-dispersion of the reflection at these water droplets can be compared with the reflection at an obstacle that is located relatively close to the motor vehicle and lies within the examination area. It is thereby not possible to differentiate by means of evaluation electronics connected in the output of the receiver E1 whether these reflections take place in fact from an obstacle or at the water droplets.

The inventive deliberation essentially consists in arranging in that case the examination area at a greater distance in front of the motor vehicle. The enlargement of the examination range in front of the motor vehicle should be at least so far that a fictitious obstacle simulated by reflection of the radiation at the water droplets in direct proximity of the motor vehicle will not be recognized. For that purpose, the transmitter S1 is connected together with the receiver E2 which are arranged considerably further apart from one another, (distance S>>f) and whose examination range has the approximately diamond-shaped form described by the boundary lines 1 and 2 of the transmitter S1 and 6 and 7 of the receiver E2. With an examination area arranged in such a manner, an interfering reflection at close-by water droplets no longer occurs. Added thereto is the fact that the total number of the water droplets in the examination area is strongly reduced as a rule and therewith the scattering or dispersion at the water droplets is also strongly reduced. The reduction of the reflection at the water droplets, as already mentioned, is thereby greater-than the reduction of the number of the water droplets.

The transmitter S1 is interconnected with the two receivers E1 and E2 in such a manner that under normal atmospheric conditions the transmitter S1 cooperates with the receiver E1. If water droplets are now present in larger numbers in the examination area, then the receiver E2 is interconnected with the transmitter S1. The examination area is thereby placed at a greater distance from the motor vehicle. The reflection at the water droplets thereby no longer appears in an interfering manner.

Figure 2:
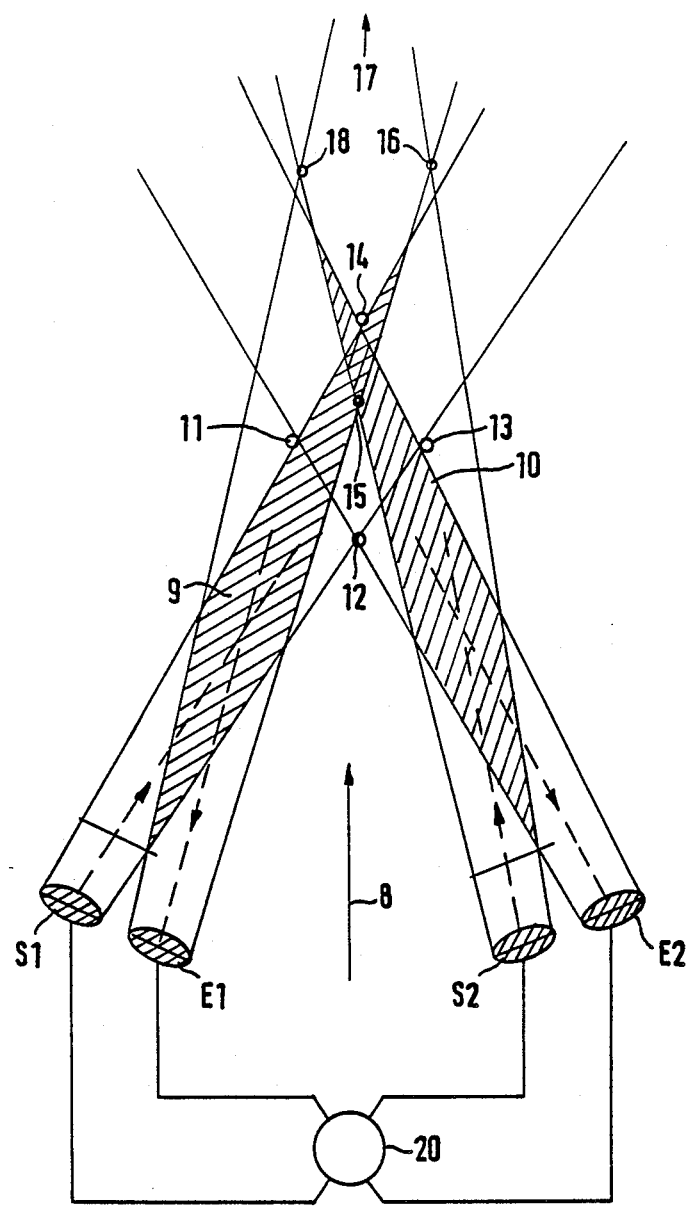
FIG. 2 is a schematic view of one embodiment of the present invention.

In the embodiment of FIG. 2, two pairs of transmitters and receivers S1 and E1, respectively, S2 and E2 are provided. These pairs are located, for example, at the two front sides of the motor vehicle, for instance, adjacent the headlights, respectively, integrated behind the windshield within the wiped area. For reasons of clarity, the two transmitter receiver pairs are arranged obliquely to the longitudinal axis (arrow 8 of the motor vehicle).

Under normal conditions, the pairs S1 and E1, respectively, S2 and E2 cooperate. They both possess examination areas in direct proximity of the motor vehicle which are indicated in cross-hatching.

The two pairs are operated alternately for reasons of unambiguity of the received signal.

Figure 1B:
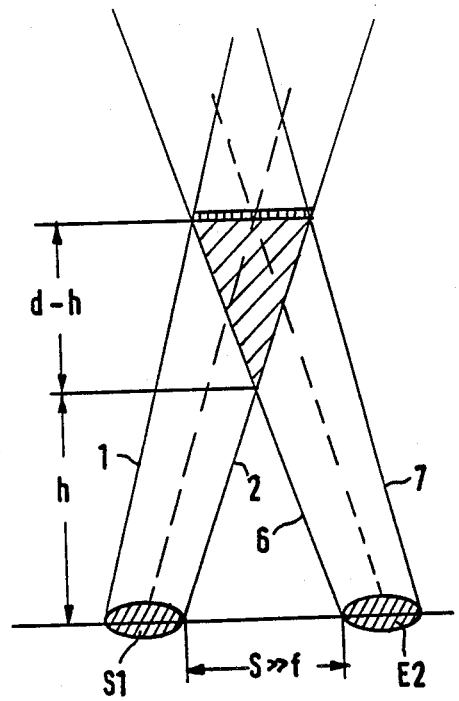

In case of fog or strong rain, it will now lead to a strong reflection at close-by water droplets, as illustrated in the part a in FIG. 1. When poor visibility occurs it is again desirable to focus at a range further away from the close range indicated by the single cross-hatched areas 9 and 10 in order to be able to recognize nonetheless an obstacle with certainty. To this end the transmitter S1 is now interconnected with the receiver E2 and alternately, respectively, subsequently the transmitter S2 with the receiver E1. The transmitter S2 and the receiver E2 possess an examination area whose corner points are indicated by the reference numerals 11 to 14. The corner points for the examination area for the transmitter S2 and the receiver E1 are indicated by the reference numerals 15 to 18. It can be clearly recognized that these two examination areas are located at a considerably greater distance in front of the motor vehicle and an interfering reflection at close-by water droplets can practically no longer occur. As in the FIGS. 1(a)-(b) embodiment, the new pairings of transmitter $S_1$-receiver $E_2$ and transmitter $S_2$-receiver $E_1$ use are operated alternatively for reason of unambiguity of the received signal for substantially the same reasons as the original pairing of transmitter $S_1$-receiver $E_1$ and transmitter $S_2$-receiver $E_2$.

An obstacle located in the examination area is safely recognized also in case of non-existing optical recognition for the vehicle user.

The switching of the transmitter S1 from the receiver E1 to the receiver E2, respectively, of the transmitter S2 from the receiver E2 to the receiver E1 can be realized in different ways. One possibility is to undertake the switching in conjunction with turning on a fog light. In the alternative, the switching can also take place on the basis of the radiation reflected from the close range during fog and simulating an obstacle. A switch 20 serves for that purpose which undertakes the desired switching in dependence on the actuation of a fog light switch (not shown) or in dependence on the signal received by means of the receivers E1, respectively, E2 with an effective transmitter S1, respectively, S2. As the components for realizing such switching functions are known to those skilled in the art, involving commercially available items, a detailed description thereof is dispensed with herein.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An arrangement for the recognition of obstacles for motor vehicles by viewing reflections from obstacles between a transmitter and a receiver, comprising: a first transmitter means and a first receiver means for electromagnetic radiation which are directed onto a first close range examination area that begins at a close distance range in front of the first transmitter means; a second receiver means directed together with the first transmitter means to a second examination area which begins at a considerably greater second distance range from the first transmitter means than the first close distance range; selection means normally causing the close distance range transmitter-receiver combination to be activated and the considerable greater distance range transmitter combination to be inactivated, the selection means inactivating the first close distance range transmitter-receiver combination and activating the second greater distance transmitter-receiver combination upon the occurrence of poor visibility at the first close range, and wherein the greater range distance is set with respect to the first close range distance such that reflections that would be caused by poor visibility at the first close range distance would not occur at the second greater range distance.

2. An arrangement according to claim 1, wherein there is a second transmitter means; the second transmitter means is also directed with the second receiver means to a second close distance range at the same distance from the second transmitter means as the first close range is to the first transmitter means; the second transmitter means together with the first receiver means is directed to the greater second distance range; and wherein the selection means is operable to alternatively interconnect cross-wise the first transmitter means with the second receiver means as well as the second transmitter means with the first receiver means.

3. An arrangement according to claim 2, wherein the cross-wise interconnection by the selection means takes place in dependence on the turning-on of a fog light.

4. An arrangement according to claim 3, wherein the cross-wise interconnection by the selection means takes place in dependence on the intensity of the radiation reflected from the close ranges.

5. An arrangement according to claim 2, wherein the cross-wise interconnection by the selection means takes place in dependence on the intensity of the radiation reflected from the close ranges.

* * * * *